United States Patent [19]

Olsen

[11] 4,159,597
[45] Jul. 3, 1979

[54] PLANTING SYSTEM INCLUDING ARTICLES OF MANUFACTURE

[75] Inventor: Robert C. Olsen, Streamwood, Ill.

[73] Assignee: Illinois Tool Works Inc., Chicago, Ill.

[21] Appl. No.: 869,728

[22] Filed: Jan. 16, 1978

Related U.S. Application Data

[63] Continuation-in-part of Ser. No. 773,027, Feb. 28, 1977, abandoned.

[51] Int. Cl.² ............................................. A01C 11/02
[52] U.S. Cl. ............................................ 47/58; 47/73; 47/84; 111/2; 206/423; 206/563; 211/71; 217/26
[58] Field of Search ................. 47/66, 73, 74, 75, 76, 47/77, 78, 84, 85, 86, 87, 58; 111/1, 2, 3, 4; 217/26, 26.5; 220/23.2, 23.4; 206/423, 562, 563; 224/45 AA, 45 BA, 48 R, 26 G, 5 M, 5 N; 294/87 R, 87 SH; 211/71, 72, 73, 74, 85, 126

[56] References Cited

U.S. PATENT DOCUMENTS

| | | | |
|---|---|---|---|
| 955,164 | 4/1910 | Husted | 224/26 G |
| 1,198,602 | 9/1916 | Sweeney | 224/5 N |
| 1,207,154 | 12/1916 | Fox | 224/5 N |
| 1,464,628 | 8/1923 | Schwartzberg | 217/26 |
| 2,487,109 | 11/1949 | Deichert | 294/87.2 |
| 3,142,133 | 7/1964 | Brooks | 47/73 |
| 3,183,624 | 5/1965 | Swett | 47/41.11 |
| 3,307,321 | 3/1967 | Beart | 294/87.2 |
| 3,517,629 | 6/1970 | Bridges et al. | 111/96 |
| 3,539,071 | 11/1970 | Ludder | 220/23.4 |
| 3,542,210 | 11/1970 | Sorensen | 211/74 |
| 3,557,489 | 1/1971 | Ferrand | 47/73 |
| 3,802,592 | 4/1974 | Wheaton | 217/26 X |
| 3,825,126 | 7/1974 | Pohl et al. | 211/71 |
| 3,889,416 | 6/1975 | Bergeon et al. | 47/86 |
| 3,906,875 | 9/1975 | Kesinger | 111/2 |
| 3,931,694 | 1/1976 | Krikorian | 47/86 |
| 4,008,543 | 2/1977 | Vilt | 211/126 X |
| 4,031,832 | 6/1977 | Edwards | 47/73 X |
| 4,043,077 | 8/1977 | Stoneholder | 47/66 |

FOREIGN PATENT DOCUMENTS

| | | | |
|---|---|---|---|
| 1414605 | 9/1965 | France | 47/79 |
| 2112753 | 6/1972 | France | 47/77 |
| 2228418 | 12/1974 | France | 47/86 |
| 1316159 | 5/1973 | United Kingdom | 47/73 |

*Primary Examiner*—Paul T. Sewell
*Assistant Examiner*—James R. Feyrer
*Attorney, Agent, or Firm*—Edward L. Benno; Thomas W. Buckman; Robert W. Beart

[57] ABSTRACT

A planting system in which the basic unit of the system comprises a plurality of individual containers for growing plants to a stage suitable for transplanting and in which the plurality of containers are secured in a flexible carrier sheet. The securement of each of the containers in the carrier sheet is such that the entire basic unit can be handled in a number of shipping, handling, filling, growing, and transplanting operations in a convenient, unique and efficient manner. Various articles of manufacture are contemplated in the system of the invention which aid and render in the unique and efficient use of the system. Those articles of manufacture include shipping and handling cartons, holding trays, filler plates and portable pack arrangements.

6 Claims, 26 Drawing Figures

PLANTING SYSTEM INCLUDING ARTICLES OF MANUFACTURE

This is a Continuation-In-Part application of application Ser. No. 773,027 filed Feb. 28, 1977, now abandoned.

BACKGROUND OF THE INVENTION

With the ever growing use of containers in silvaculture, agriculture and horticulture for the growth of plants from either seed or cuttings to stages suitable for transplanting, many systems and arrangements are known in the prior art which in one way or another purport to provide efficient, economical procedures and devices for plant growing containers. Some systems contemplate containers that are nested or knocked-down for economical packed shipment of the containers from manufacturers to nurseries and greenhouses. Other systems contemplate trays and blocks having plant growing cavities for efficient growing of a large number of plants in a greenhouse operation. Other systems are known that use devices which are supposed to make the transplanting or outplanting operation efficient and labor saving. Thus, while one system or another in the prior art provides one or more labor saving devices in the total procedure from manufacture to transplanting site, no known system includes as many unique labor saving procedures and devices as the system of the subject invention.

SUMMARY OF THE INVENTION

The basic unit of the system of the subject invention is the combination of a plurality of certain individual containers, each of which is an efficient seedling growing container, and a carrier sheet. The individual containers of the subject invention are modified forms of the container taught in U.S. Pat. No. 4,031,832. In one form, each of the containers is provided with a depending post or pin projection which enables each container to be inserted, firmly held and selectively removed from one of the apertures provided in one embodiment of the carrier sheet of the subject invention. In another form, the lower end of the container is provided with a bullet shaped nose and a radially projecting shoulder on that nose which enables each container to be inserted in a further embodiment of the carrier sheet with the nose thereof partially through a carrier aperture and effectively releasably locked therein with the radially projecting shoulder below the sheet. The carrier sheet is preferably formed from a sheet of resilient elastic plastic material. The container receiving apertures in the carrier sheet are sized to grippingly engage and hold each of the containers in the sheet for use of the basic unit throughout the various steps of the system, as contemplated, from manufacturer to transplanting in the ground as will be apparent from the detailed description.

The basic unit of the system of the invention as described above, is easily deposited in a properly sized shipping carton for convenient handling and shipment of the unit to a greenhouse or nursery operation. In a number of embodiments of the invention, the basic unit in the shipping carton may also be conveniently used in container filling operations in a greenhouse and in the further growing of the plants therein.

The invention further contemplates a number of embodiments of a rigid tray which is quickly and easily associated with the basic unit for further handling of the unit in filling and seedling growing operations.

The invention further contemplates an article of manufacture denoted as a filler plate, which is also easily associated with the basic unit for rapid container filling operations of all of the containers in the basic unit. The invention contemplates the filler plate in a number of embodiments, and in a number of embodiments which may be included with a basic unit in its shipping carton for filling and handling operations therewith.

After the seedlings have been grown to a stage suitable for transplanting or outplanting, the basic unit may be conveniently either reinserted in the original shipping carton, if the unit has been associated with the rigid tray in the growing operation, or left in the shipping carton, if the seedlings have been grown in the containers in the shipping carton and transported to the transplanting site. At the transplanting site, the invention contemplates that the basic unit be attached to a backpack assembly on a person's body with the carrier sheet of the basic unit depending from the backpack. Then using a tubular planting tool such as shown in U.S. Pat. No. 4,031,832, individual containers may be conveniently pulled from the carrier sheet and appropriately inserted in the planting tool and planted into the ground. The basic unit may also be used in tractor drawn machines for planting the containers.

The primary object of the present invention is to provide a planting system of a plurality of plant growing containers held together as a basic unit that is conveniently and efficiently used in a wide range of seedling growing procedures from manufacture of the unit to transplanting or outplanting with the basic unit remaining intact until the final planting of the individual containers and plants.

Other objects and features of the invention will be apparent upon a perusal of the hereinafter following detailed description read in conjunction with the drawings.

DETAILED DESCRIPTION OF THE DRAWINGS

DETAILED DESCRIPTION OF THE PREFERRED EMBODIMENTS

Figure 9:
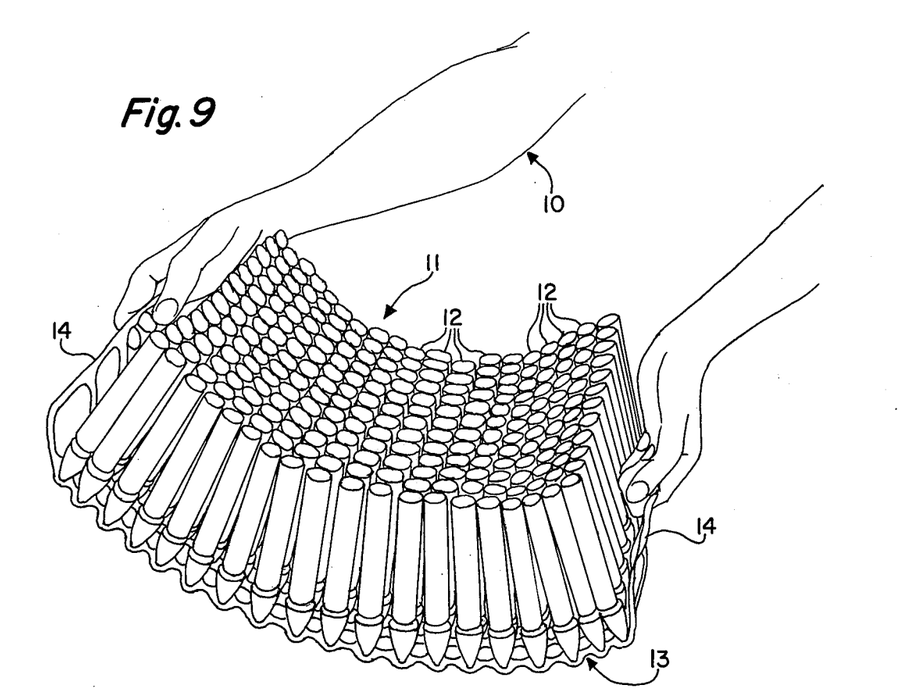
FIG. 9 is a perspective view showing a person carrying the basic unit.

In the perspective view of FIG. 9 a person 10 is shown holding one embodiment of the basic unit 11 of the subject invention. That basic unit comprises a plurality of containers 12 carried in a carrier sheet 13.

Figure 1:
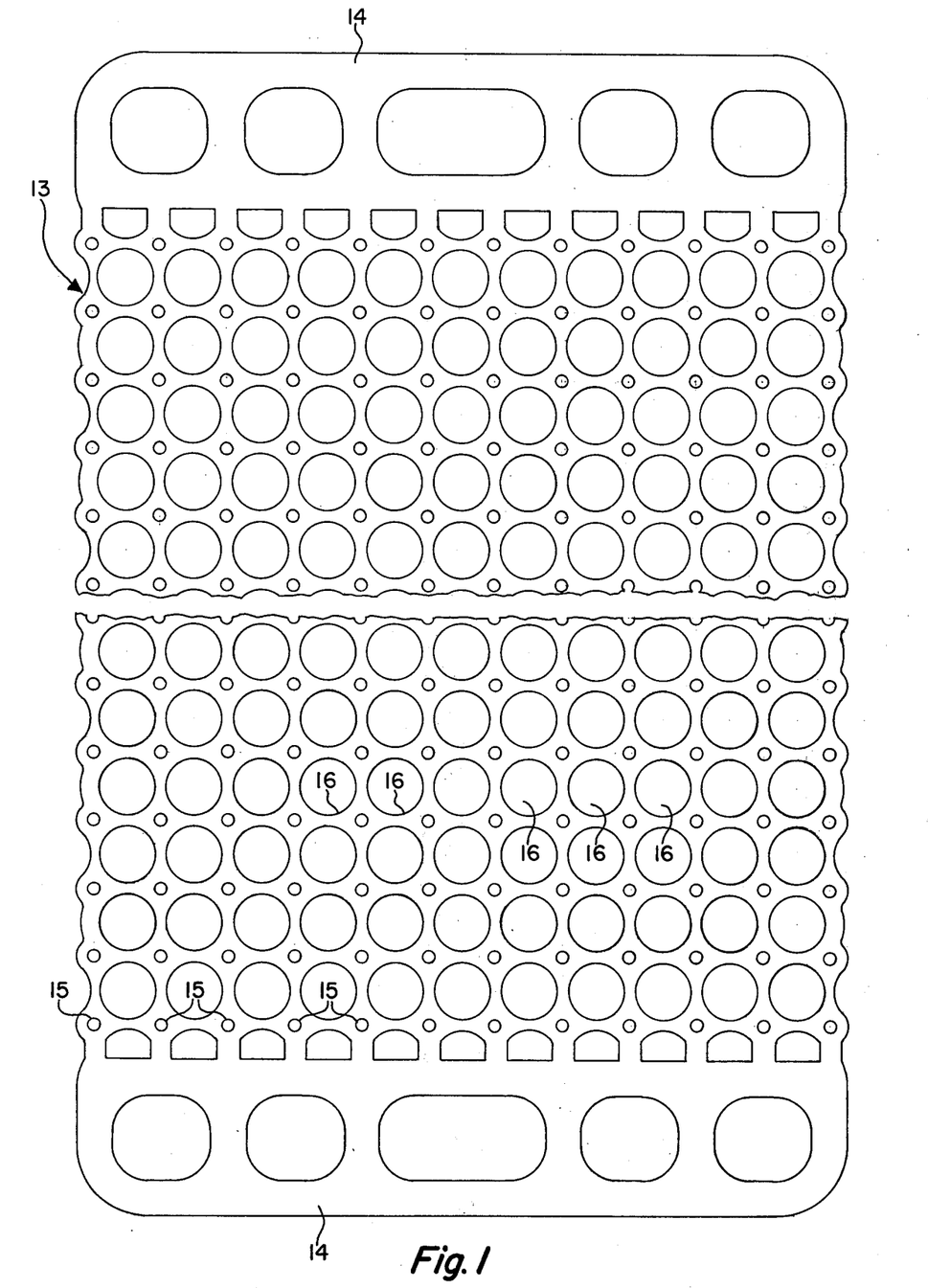
FIG. 1 is a plan view of one embodiment of the carrier sheet of the basic unit of the subject invention.
Figure 2:
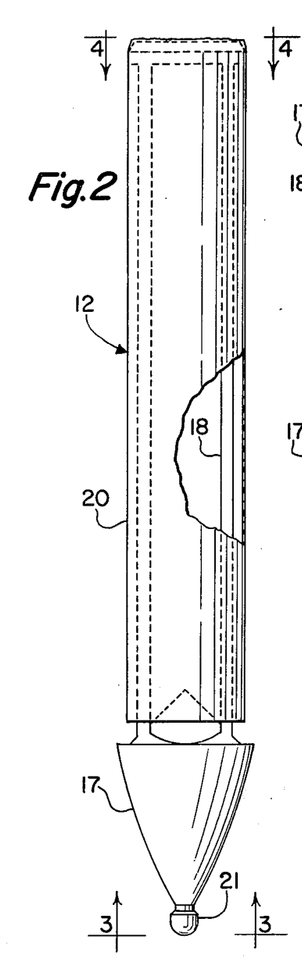
FIG. 2 is a side elevational view of one form of container constructed for association with the carrier sheet of FIG. 1.
Figure 19:
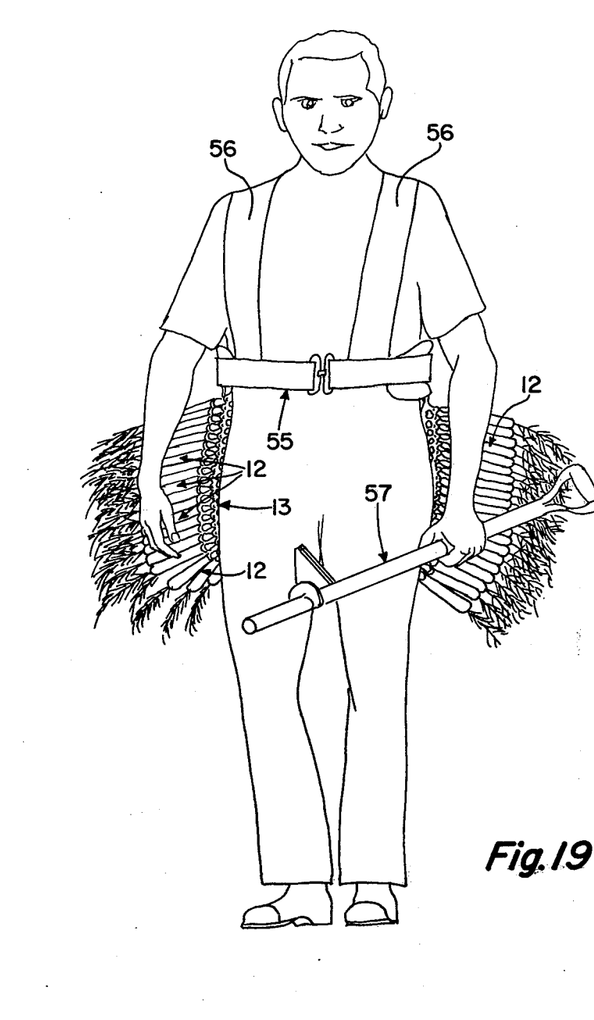
FIG. 19 is a pictorial representation of a person carrying the basic unit with seedlings ready for transplanting in the backpack arrangement of the system of the subject invention.
Figure 20:
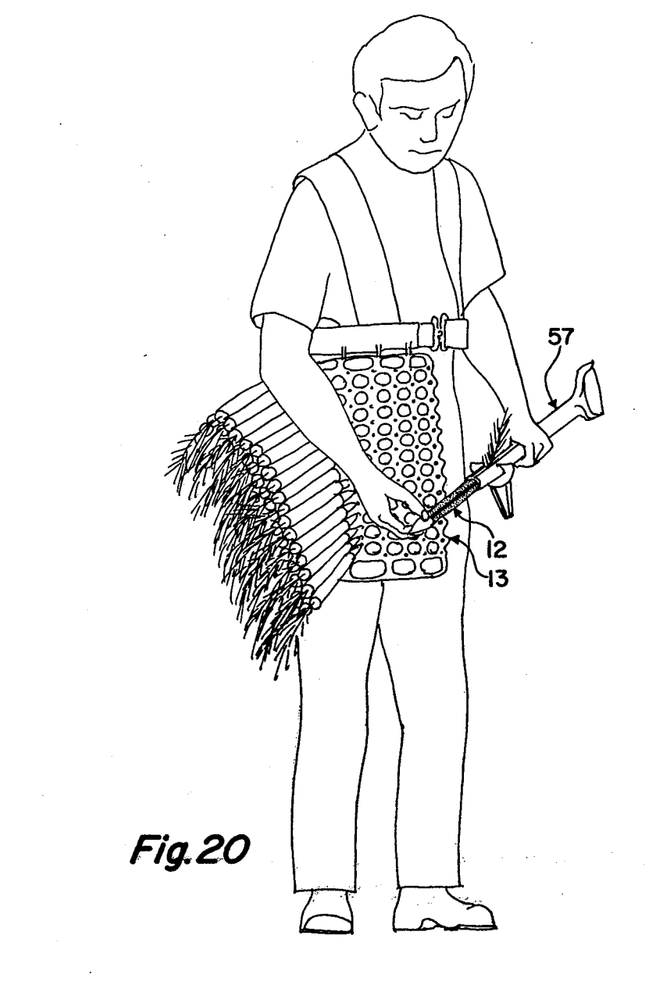
FIG. 20 is a pictorial representation similar to FIG. 19 showing individual containers having been removed and planted in the appropriate planting operation.

The carrier sheet 13 is shown in plan view in FIG. 1 and is preferably made from a sheet of elastic plastic material, such as low-density polyethylene. Preferably the sheet material from which the carrier sheet 13 is made is of a uniform thickness and as thin as possible for the intended purposes of the invention. In one reduction to practice of the invention, a carrier sheet 13 in a thickness of 24 mils was found suitable. At least one end and preferably two opposed ends of the carrier sheet 13 are provided with integral handle or carrying elements 14. When the carrier sheet 13 is made in a rectangular form as shown in FIG. 1, additional handle or carrying elements may be provided along one or more of the long sides of the carrier sheet for carrying or attachment of the carrier sheet 13 to a backpack arrangement such as shown in FIGS. 19 and 20.

The carrier sheet 13 further includes a plurality of small apertures 15 arranged in a plurality of parallel rows and in ranks perpendicular to the rows. The apertures 15 are sized so that the peripheral edge thereof will resiliently grip the post member on the lower end of the containers shown in FIGS. 2–9.

The carrier sheet 13 is further provided with a plurality of large apertures 16 which are arranged in rows and ranks between the apertures 15 as shown in FIG. 1. The apertures 16 essentially serve two purposes, the first function of those apertures is to permit air movement through and water drainage from the sheet during the growing operation of seedlings in the containers of the units, and the second function is to permit the basic unit of the carrier sheet 13 and the containers 12 to be properly associated with the rigid tray of FIGS. 11 and 12 as will be described hereinafter.

Two embodiments of containers intended for use with the carrier sheet 13 to form the basic unit of the invention are shown in FIGS. 2–7. The various details of those containers are taught in the U.S. Pat. No. 4,031,832 and reference is made to that patent for a more thorough understanding of the construction and use of such containers in the subject invention. The container 12 shown in FIGS. 2–4 comprises a base section 17, a plurality of ribs 18 and a sleeve 20. The base 17 is formed with the lower portion thereof having a ground penetrating or bullet-shaped configuration. The upper surface of the base 17 is upwardly domed and in the particular form shown is made as a four-sided pyramid. The lowermost portion of the base 17 is provided with a post or pin projection 21. In a preferred form the pin projection 21 has a reduced neck portion enabling the container 12 to be firmly held in one of the apertures 15 when the pin projection 21 is fully inserted therein.

Figures 3, 4, 5, 6, 7, 8:
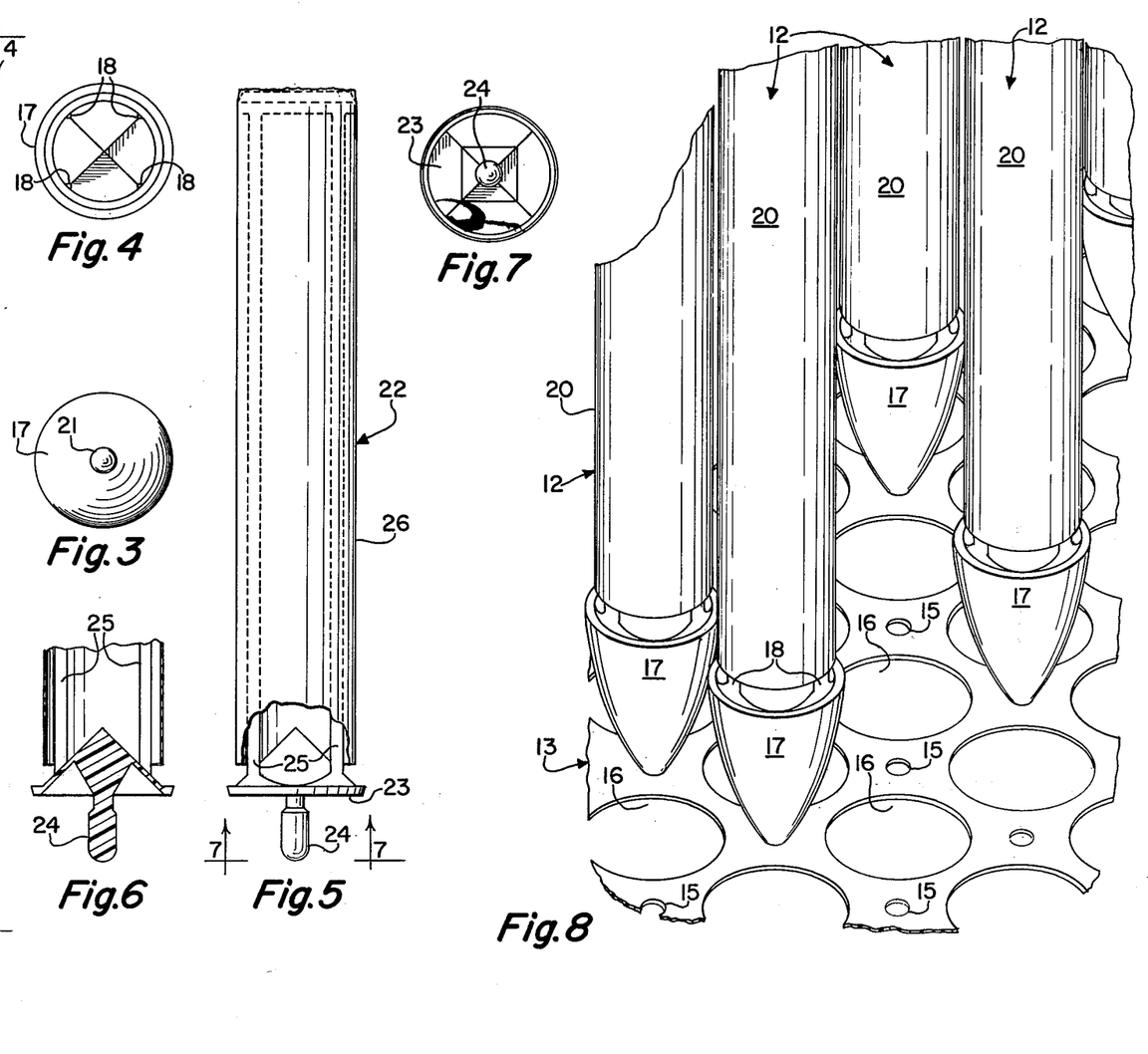
FIG. 3 is a bottom plan view of the container of FIG. 2.
FIG. 4 is a top plan view of the container of FIG. 2.
FIG. 5 is a side elevational view of another embodiment of the container.
FIG. 6 is a partial cross-sectional view of the lower part of the container shown in FIG. 5.
FIG. 7 is a bottom plan view of the container shown in FIG. 5.
FIG. 8 is an isometric view of a portion of the basic unit of the subject invention showing a number of the containers of FIG. 2 associated with the carrier sheet of FIG. 1.

The ribs 18 which in the embodiment shown are four in number, are secured in a parallel spaced-apart relationship about the base of the pyramid on the upper surface of the base 17. The upper ends of the ribs 18 are formed to include a split or frangible ring element. The sleeve 20 is substantially cylindrical and is preferably formed from a thin plastics material. The sleeve 20 is mounted about and supported on the ribs 18 with the lower end of the sleeve 20 spaced from the base of the pyramid of the base 17 to provide for water drainage from between the sleeve 18 and the base 17. In that arrangement a complete container 12 is provided for the growing of a plant therein to a stage suitable for transplanting. The sleeve 20 is further provided with a weakened line or tear strip longitudinally thereof to permit removal of the sleeve either immediately before or contemporaneously with the transplanting operation. FIG. 8 shows how a number of containers 12 are associated with the carrier sheet 13 to essentially upstand therefrom in a parallel spaced-apart relationship with the pin projections 21 snapped through the apertures 15. A complete assembly of containers 12 and the carrier sheet 13 is shown in FIG. 9.

FIGS. 5–7 show a modified form of container 22 in which the base 23 is not provided with a ground penetrating nose configuration. The base 23 as may be seen in FIGS. 5 and 6, is provided with a pyramid-shaped upper surface and with a pin projection 24 depending from the center underside surface of the base 23. In a preferred form the pin projection 24 is provided with a reduced diameter neck portion. Conveniently, the base 23, pin projection 24, and ribs 25 may be molded as a complete integral assembly from a suitable plastics material such as polystyrene. The container 22 further includes a sleeve 26 which is mounted about and supported on the ribs 25. In use, a plurality of containers such as container 22 may be associated with the carrier sheet 13 with the pin projections 24 snapped through the apertures 15 and with the under outer surface of the bases 23 substantially resting on the carrier sheet 13. It should be noted that the relative lengths and diameters of the containers 12 are merely exemplary and many different ratios of lengths and widths of such containers may be used in practicing the invention.

The invention contemplates that in the initial manufacture, appropriate machinery or fixtures be used to associate the carrier sheet 13 and the containers 12 such as shown in FIG. 9 to produce the basic unit of the invention. That basic unit is intended to remain as a unit through many of the necessary further steps in the use of the unit and even to the final transplanting stage when individual containers with growing seedlings therein are removed from the carrier sheet 13 and planted in the ground. As a unit, the carrier sheet 13 and containers 12 may be carried by the handle elements 14 such as shown in FIG. 9. Also, the unit may be safely carried from one end with the carrier sheet 13 in a substantially vertical plane and with the containers 12 securely carried therein and aligned in a somewhat outwardly and downwardly inclined direction.

Figure 10:
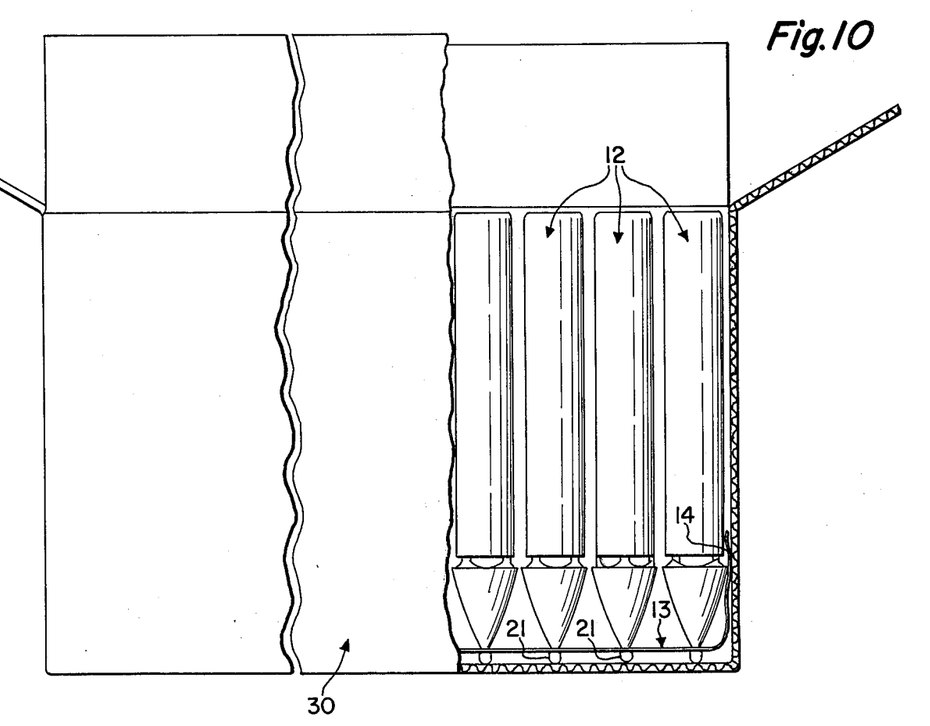
FIG. 10 is a side elevational view, partially in cross section, of the combination of the basic unit and a carton.

In one embodiment of the invention, the basic unit is deposited in a carton 30 such as shown in FIG. 10. The unit rests within the carton 30 with the pin projections 21 on the bottom wall of the carton 30, with the carrier sheet 13 positioned immediately above the bottom wall of the carton 30, and with the plurality of containers 12 upstanding in the carton between the four sidewalls thereof. Preferably, the four sidewalls of the carton 30 have lengths and widths substantially equal to the corresponding peripheral dimensions of the basic unit and the sidewalls have a height substantially equal to the length of the containers 12. In that arrangement the upper carton flaps may be closed for secure shipment and handling of the basic unit.

Figure 14:
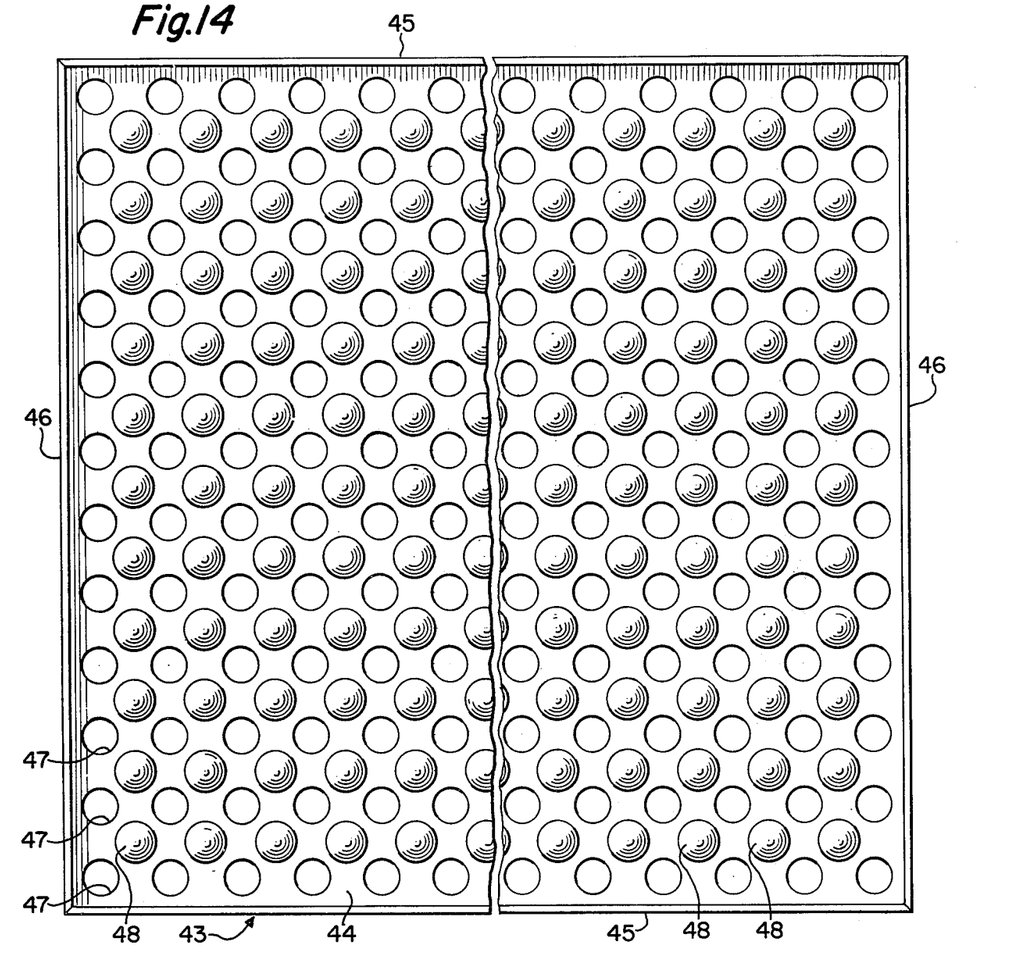
FIG. 14 is a bottom plan view of the filler plate of the system of the invention.
Figure 15:
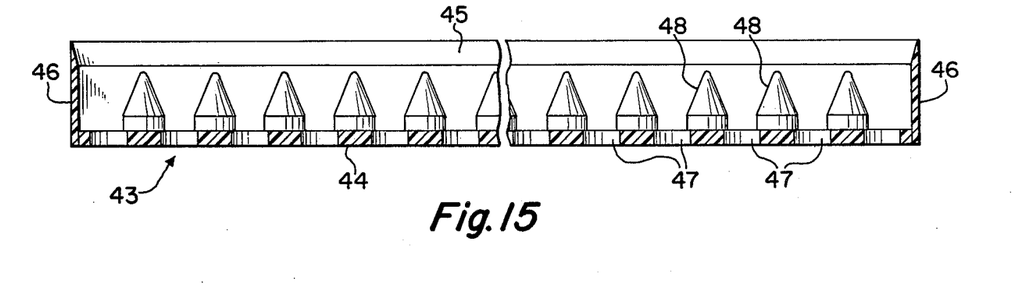
FIG. 15 is a side elevational view partially in section of the filler plate of FIG. 14.

In another embodiment of the invention, the carton 30 may further include a filler plate such as the filler plate shown in FIGS. 14 and 15, or a filler plate (not shown) which merely comprises a sheet of corrugated paperboard may be disposed on top of the basic unit beneath the upper carton flaps. Preferably the sheet would have a length and width substantially equal to the internal length and width of the carton 30. Such a corrugated paperboard filler plate may be further provided with apertures therein arranged in the pattern of the containers 12 so that upon opening of the carton 30 a bulk quantity of soil or growing medium may be deposited on top of the filler plate and brushed over the filler plate until the growing medium in dropping through the apertures in the filler plate fills all of the containers 12. The paperboard filler plate may then be removed for further use of the basic unit and the growing of plants in each of the containers 12. In forming the apertures in the corrugated paperboard filler plate, those apertures may be formed by a slitting of the material of the filler plate in "X" patterns and with a downward folding of the triangular tabs so produced into the upper ends of each of the containers 12.

In some arrangements, if the carton 30 is made of a material that will not be destroyed by moisture during the growing process of plants in the containers 12, the basic unit may be left in the carton 30 during the growing process of the plants to the transplanting stage. Conveniently in such an arrangement, the bottom wall of the carton 30 may be provided with holes to permit excess water to drain from the carton 30. Further in such arrangements, cardboard dividers arranged in a grid pattern may be initially placed in the carton 30 between the containers 12 to aid in holding the containers 12 in an upright pattern during the growing process and further to prevent root growth between containers 12 where during the growing process roots may emerge from between the lower ends of the sleeves 20 and the bases 17 of the containers 12.

If in the above-described arrangement the plants have been grown to a seedling stage in the carton 30, the carton 30 in the open condition with the top growth of the plants extending above the containers 12 may be carried or otherwise transported to the transplanting site. The basic unit may then be removed from the carton 30, individual containers 12 pulled from the carrier sheet 13, and upon removal of each sleeve 20 from the container 12 the remaining base 17, ribs 18, growing medium and root mass of the plant may then be planted in the ground. In the embodiment of the container shown at 12, a tubular planting tool such as shown and described in the noted Edwards' application may be used for injection planting of the container absent the sleeve. Such a tool essentially comprises a simple tube having a longitudinal slot extending from the lower end thereof and having an internal diameter substantially equal to the outer diameter of the ribs 18, growing medium and root mass of the plant, so that the ribs 18, growing medium and root mass of the plant may be received within the tube with the lower end of the tube in vertical abutment with the outer upper surface of the ground penetrating nose of the base 17 and with the top growth of the plant extending exteriorly of the tool through the slot therein. With such a tool a container 12, absent its sleeve, with the growing medium therein, may be pushed into the ground in an injection planting operation. The planting procedure is then completed by withdrawing the tool from the ground leaving the container 12, absent its sleeve, with the root mass and growing medium of the plant in the ground, and with the top growth of the plant projecting above the ground. If necessary, a tamping operation can be performed to remove any cylindrical space remaining in the ground about the ribs 18 upon withdrawal of the planting tool.

Figure 12:
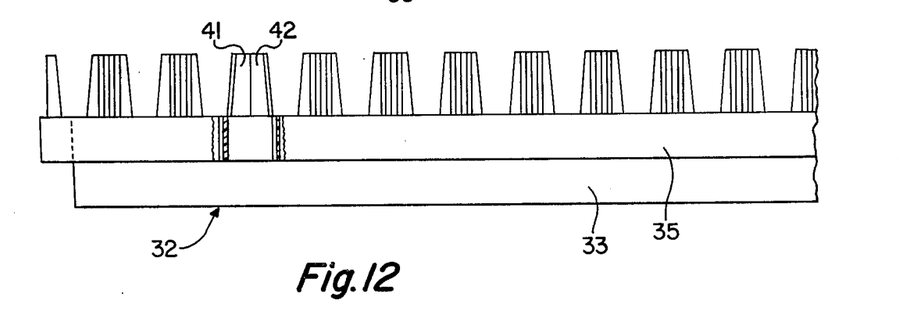
FIG. 12 is a side elevational view of the structure shown in FIG. 11.
Figure 13:
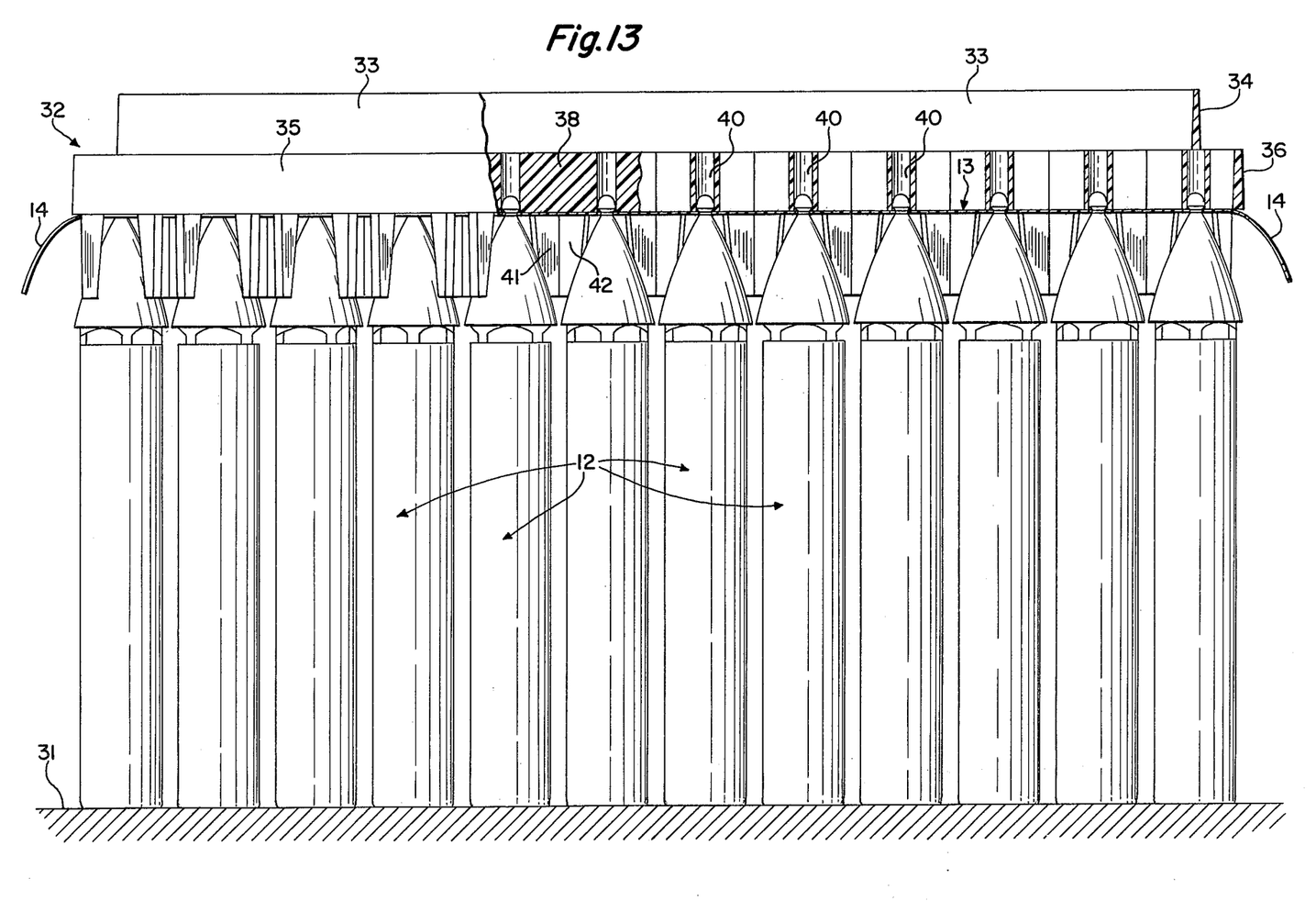
FIG. 13 is a side elevational view showing how the tray of FIGS. 11 and 12 is associated with the basic unit of FIG. 9.

In practicing the embodiment of the invention wherein the basic unit of the containers 12 and carrier sheet 13 is removed from the carton 30, the basic unit may be conveniently withdrawn and held as in FIG. 9 and then inverted upon a flat horizontal surface such as surface 31 shown in FIG. 13. If necessary, the basic unit may then be slightly jostled to substantially provide an inverted upright standing position of all of the containers 12 with the carrier sheet 13 horizontally disposed adjacent the upper end of the inverted unit as shown in FIG. 13. In that condition, the basic unit will easily accept association with the rigid tray 32 shown in FIGS. 11–13.

Figure 11:
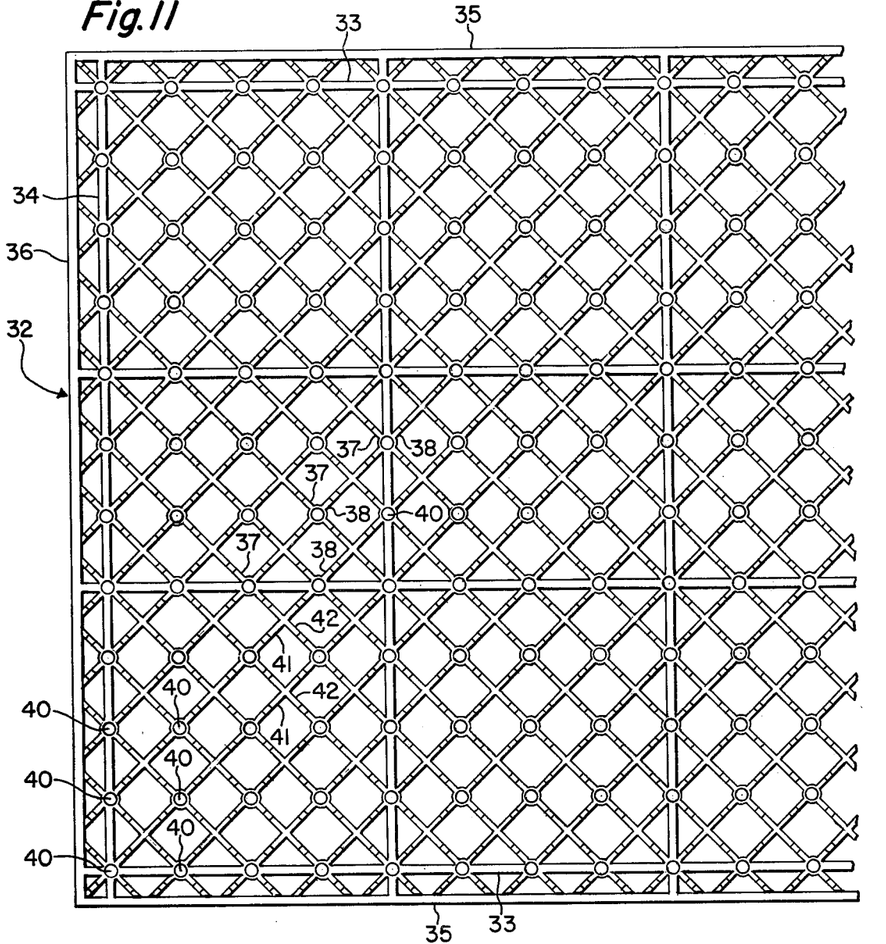
FIG. 11 is a top plan view of a portion of one embodiment of a rigid tray for supporting the basic unit during growth of the plants.

As shown in FIGS. 11–13, the rigid tray 32 comprises a rectangular base of four vertically aligned and interconnected walls 33 and 34 supporting an array of container receiving pockets formed by an open lattice of diagonally intersecting wall members and upstanding post members. The open lattice of diagonal walls are formed within four walls 35 and 36 and are indicated at numerals 37 and 38. At alternate intersections of the walls 37 and 38 an enlarged junction is formed with an aperture 40 therein. The apertures 40 have a diameter substantially equal to the maximum diameter of the depending pin projections 21 of the containers 12 to receive those pin projections therein as shown in FIG. 13. At the alternate intersections of the walls 37 and 38 between the intersections having the apertures 40, a pair of intersecting upstanding post members 41 and 42 are formed. The vertical edges of the post members 41 and 42 are tapered to firmly engage the sides of the ground penetrating nose configuration of the bases 17 of the containers 12. Obviously, the intersecting post members 41 and 42 along the outer periphery of the tray 32 adjacent the walls 35 and 36 are V-shaped in plan view rather than X-shaped as are the post members 41 and 42 within the tray. As seen in FIG. 13, the tray 32 is assembled to the inverted basic unit by inverting the tray 32 over the upwardly projecting bases 17, and then moving the tray 32 onto the basic unit until the post members 41 and 42 engage the sides of the ground penetrating nose of the base sections 17 and the pin projections 21 enter the apertures 40. In that assembly operation, each pair of intersecting post members 41 and 42 is projected through one of the apertures 16 in the carrier sheet 13. The post members 41 and 42 at their widest base portions define an "X" configuration, the extending tips of which may be included in a circle of substantially the diameter of the apertures 16 in the carrier sheet 13. In the assembled condition of the tray 32 in the basic unit as shown in FIG. 13, the entire arrangement may then be uprighted to position the tray 32 beneath the basic unit such as shown in FIG. 16.

If the form of container shown at 22 in FIGS. 5-7 is to be used in practicing the invention, the tray 32 would be modified by omitting the post members 41 and 42.

Figure 16:
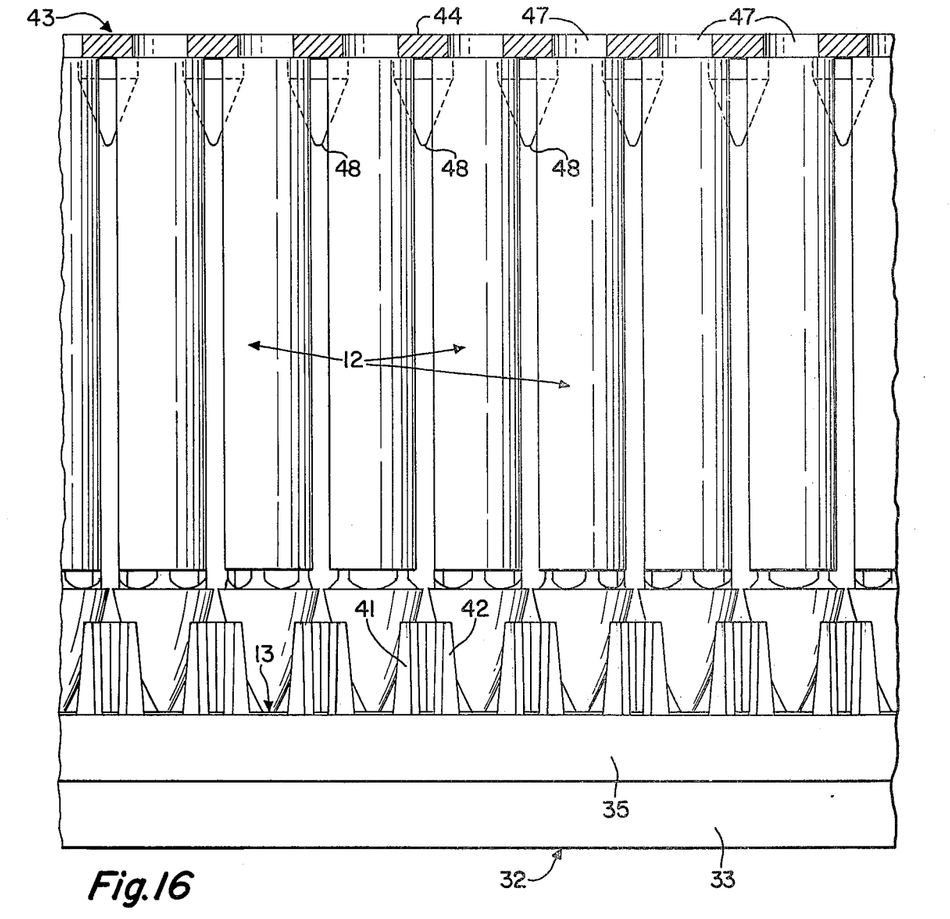
FIG. 16 is a side elevational view showing a portion of the tray of FIGS. 11 and 12 with the basic unit of FIG. 9 associated therewith and with the filler plate of FIGS. 14 and 15 mounted thereon.

The invention further contemplates that with the tray 32 supporting the basic unit as shown in FIG. 16, the filler plate 43 shown in FIGS. 14-16 may then be associated therewith for filling of each of the containers 12 with an appropriate growing medium for the plants to be grown in each of the containers 12. The filler plate 43 is shown from the underside thereof in FIG. 14 and comprises a rectangular plate 44 to the edges of which are secured four depending walls 45 and 46. The length and width of the filler plate 43 measured between the inner surface of the walls 45 and 46 is substantially equal to the length and width of the basic unit measured along lines tangentially engaging the outer periphery of the sleeves 20 of the containers 12. The plate 44 is provided with a plurality of apertures 47 therethrough arranged in the pattern of the containers 12 in the basic unit. Between each group of four apertures 47, the underside of the plate 44 is provided with tapered blocks 48. The taper of the blocks 48 is such that the blocks are widest at their securement position to the plate 44 and taper to a point at the extending ends thereof. The maximum diameters of the blocks 48 are such that when the filler plate 43 is applied over the upper ends of the containers 12 of the basic unit as shown in FIG. 16, each block 48 will tangentially engage four adjacent containers 12 to accurately position each aperture 47 concentrically of the upper end of each container 12. The pointed ends of the blocks 48 aid in easily assembling the filler plate 43 over the upper ends of the entire array of containers 12 because even with some misalignment of the containers 12 from a true vertical position, the pointed ends of the blocks 48 can enter between adjacent containers 12 and urge the upper ends of the containers 12 into proper alignment between the blocks 48 and concentrically below the apertures 47. The outer walls 45 and 46 of the filler plate 43 with their tapered depending edges likewise serve to direct the outer periphery of the outer ranks and rows of containers 12 into proper alignment with the apertures 47 of the filler plate 43.

Figure 17:
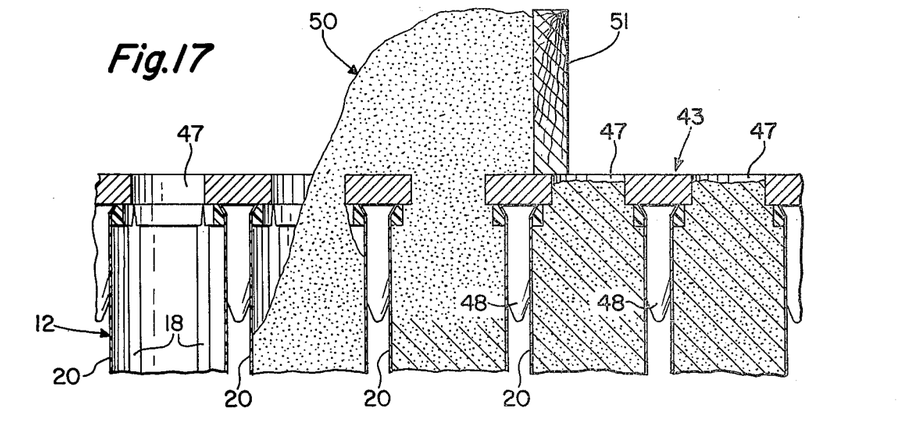
FIG. 17 is an enlarged view of a portion of the structure shown in FIG. 16, showing the filling process for the containers in the system of the subject invention.

With the filler plate 43 assembled to the containers 12 as shown in FIG. 16, the basic unit is prepared for bulk filling of all of the containers 12 with a growing medium. One procedure by which such filling can be accomplished is shown in the fragmentary view of FIG. 17. In FIG. 17, the containers 12 are shown in diametral cross section. A bulk quantity of growing medium 50 is deposited on top of the filler plate 43, and with a block 51 or a brush is swept across the upper surface of the filler plate 43 to cause the growing medium 50 to drop through the openings 47 into the containers 12. Repeated sweeping of the block 51 over the upper surface of the filler plate 43 is often necessary to completely fill each of the containers 12. Further, under some conditions it is further advantageous to vibrate or otherwise jar the entire assembly to aid in compacting the growing medium in each of the containers 12 as the filling occurs.

When the containers are appropriately filled with growing medium, the filler plate 43 and any excess growing medium 50 may be removed. Either before the filler plate 43 is removed or afterwards, known forms of dibbles or dibble boards may be used to dibble the growing medium in the upper end of each container 12 for appropriate depositing of the seed of a plant therein. If additional growing medium or if a layer of gravel is to be deposited over the seed, dibbling with the filler plate 43 remaining on the containers 12 is preferred because the additional growing medium or crushed gravel may also be bulk swept over the upper surface of the filler plate 43 into each of the containers 12.

Once the filler plate 43 has been removed and the planting procedure has been completed, a plurality of assemblies of trays 32 and basic units of containers 12 and carrier sheets 13 may be placed on spaced-apart beams, such as beams 52, in a greenhouse. In such a greenhouse arrangement, the assemblies are conveniently placed in close rows and ranks throughout the greenhouse for growing a large number of plants in a minimum area.

Figure 18:
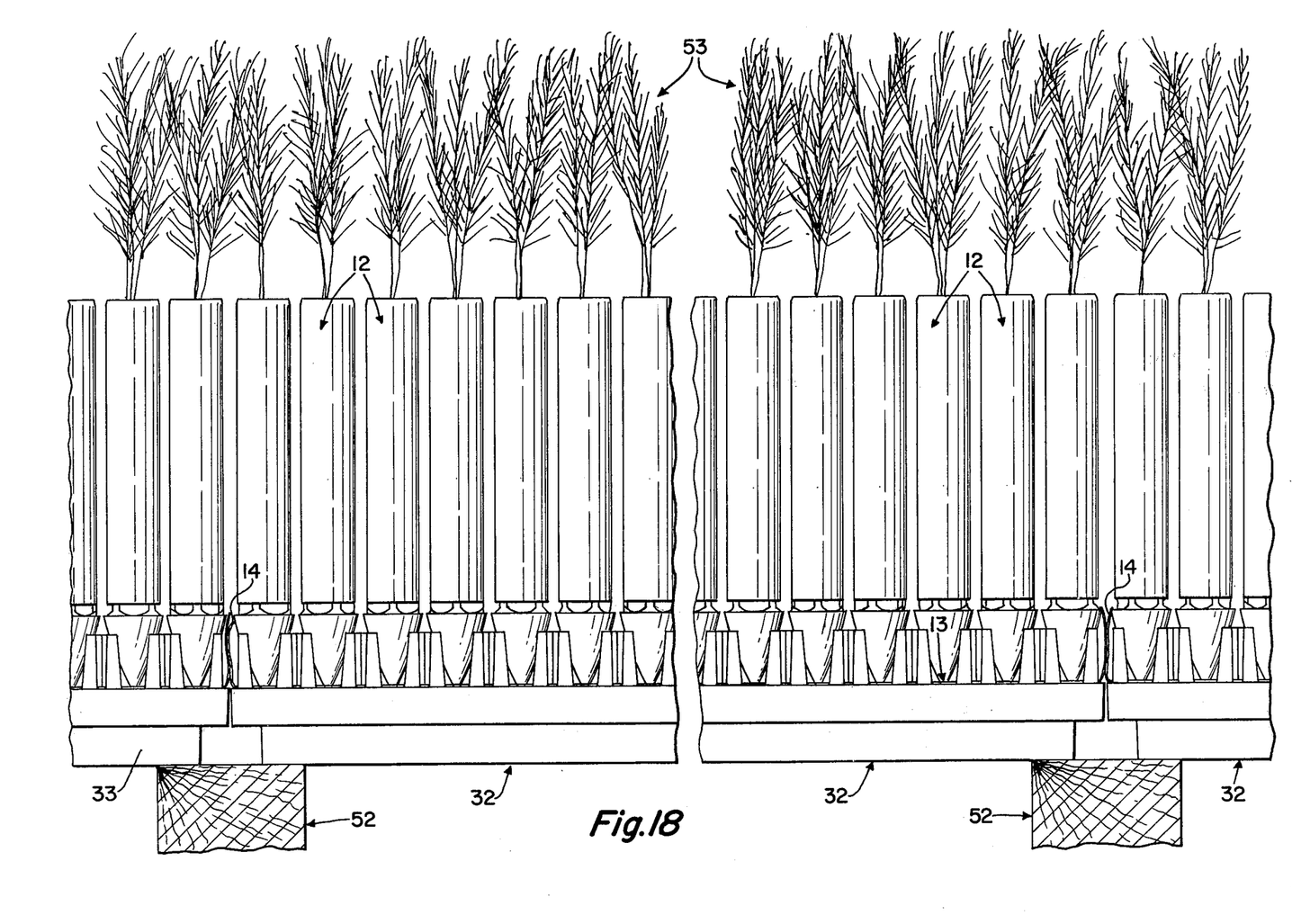
FIG. 18 is a side elevational view of portions of a number of trays of FIGS. 11 and 12 with basic units of FIG. 9 as those components may be supported in a greenhouse for growing of the seedlings.

Once the plants have grown to a stage suitable for transplanting such as the plants 53 shown in FIG. 18, the basic units now including a plurality of plants are lifted by pulling the carrier sheet 13 upwardly off of the trays 32. The basic units with the growing plants may then be dropped into open cartons such as carton 30, and transported to the transplanting site.

At the transplanting site a basic unit with the growing plants, is removed from its carton and one edge thereof is attached to the belt portion 55 of a backpack such as shown in FIGS. 19 and 20. Conveniently, the backpack includes shoulder straps 56 secured to the belt portion 55 for convenient carrying of the backpack by a person. The carrier sheet may also include integral straps, if desirable, to aid in carrying the basic unit on a person's body. The basic unit of the carrier sheet 13 and containers 12 is arranged to conveniently depend from the waist of a person about his side and back areas. As shown in FIGS. 19 and 20, the containers 12 will remain firmly secured to the carrier sheet 13 and will be aligned in a downwardly and outwardly inclined direction substantially as shown. In reductions to practice of the invention, it has been found that when the seedlings were conifers ready for transplanting, very little growing medium would fall from the downwardly inclined containers 12. As the person walks over the transplanting site he conveniently further carries a planting tool such as planting tool 57 shown in FIGS. 19 and 20 and described in detail in the above-noted U.S. Pat. No. 4,031,832. Reaching to his side with one hand, a person may conveniently pull an individual container 12 from the carrier sheet 13 for planting of the container absent its sleeve and with the growing plant therein. Conveniently, the tear tab for sleeve removal may be grasped between the thumb and tool to pull and remove the sleeve from the container 12. The container 12 absent its sleeve is then inserted into the lower end of the tool such as shown in FIG. 20. With the tool in a vertical position the container, root mass and growing medium of the plant and the lower end of the tool are then pushed into the ground in an injection planting procedure. Upon withdrawal of the lower end of the tool from the ground, the container 12 absent the sleeve remains in the ground with the root mass and growing medium of the plant being quickly and properly planted. If necessary, the person may tamp about the plant in the ground to insure close engagement between the root mass of the plant and the adjoining soil into which the plant has been inserted. The person may then repeat the steps of pulling individual containers from the carrier sheet 13 and planting those containers and plants absent the container sleeves until the entire plurality of containers 12 have been planted. Conveniently, the belt portion 55 of the backpack may include a track that enables the person to pull the carrier sheet 13 toward the front of his body as his planting procedure requires access to containers 12 originally disposed at the back portion of his body.

Figure 21:
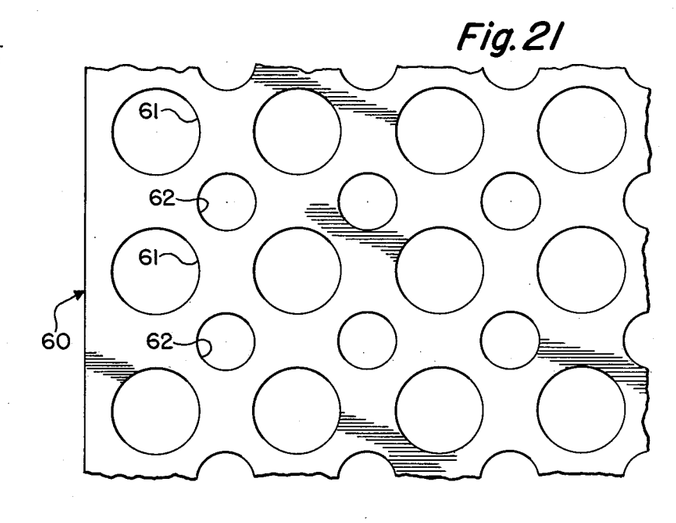
FIG. 21 is a plan view of a portion of another embodiment of the carrier sheet of the basic unit of the subject invention.

FIG. 21 shows a portion of another embodiment of the carrier sheet at 60. Carrier sheet 60 is provided with container receiving apertures 61 and drainage openings 62. The carrier sheet 60 may include any convenient number of container receiving apertures 61, and may further include integral end or side handles such as described above relative to the first embodiments. As in the first embodiments, the carrier sheet 60 is preferably formed from a sheet of resilient elastic plastic material such as polyethylene.

Figure 24:
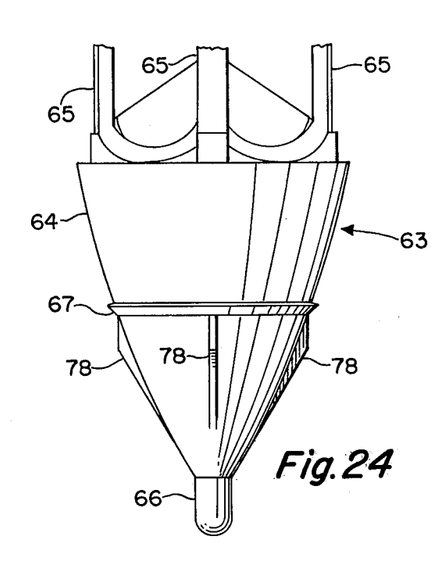
FIG. 24 is a side elevational view of the lower portion of another embodiment of the container and for association with the carrier of FIG. 21 and the tray of FIGS. 22 and 23.
Figure 25:
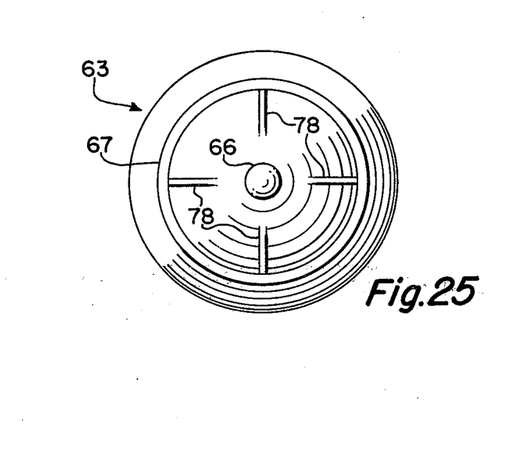
FIG. 25 is a bottom plan view of the structure of FIG. 24.

FIGS. 24 and 25 show a modified form of plant container 63 intended for association with the carrier sheet 60. The container 63 comprises a base section 64 with a plurality of rib elements 65 upstanding from the upper surface of the base section 65. Although not shown, the upper portions of the containers 63 are substantially as described above relative to the other container embodiments. The outer surface of each base section 64 is tapered downwardly and inwardly in the general shape of a cone as may be seen in FIG. 24. The lower end of each base section 64 is provided with a depending pin projection 66 the outer surface of which is of a cylindrical configuration. Substantially above the pin projection 66 the base section 64 is provided with a shoulder 67. The shoulder 67 is integrally formed on the outer surface of the base section 64 and extends radially outwardly thereof. The shoulder 67 further extends circumferentially about the base section 64 in a plane substantially perpendicular to the longitudinal axis of the container 63. It is contemplated that the shoulder 67 in a further modified form of the container 63 need not be circumferentially continuous but may be discontinuous to the extent that the discontinuous shoulder segments will hold the carrier sheet 60 thereon substantially as shown in FIG. 26.

The circumferential dimension of the outer surface of the base section 64 immediately above the shoulder 67 is greater than the peripheral dimension of the apertures 61 in the carrier sheet 60. As described above relative to the other embodiments of the invention, a plurality of containers 63 are partially inserted through the apertures 61 until the peripheral edge of each aperture 61 is disposed immediately above the shoulder 67 of each container 63. In reductions to practice of the instant embodiment, it has been found that the described arrangement of the carrier sheet 60 and containers 63 results in a base unit of containers and a carrier sheet in which the containers are substantially self-righting in the carrier sheet during handling. That result substantially simplifies handling of the basic unit in the various intended uses of the basic unit as described above relative to the other embodiments.

Figure 22:
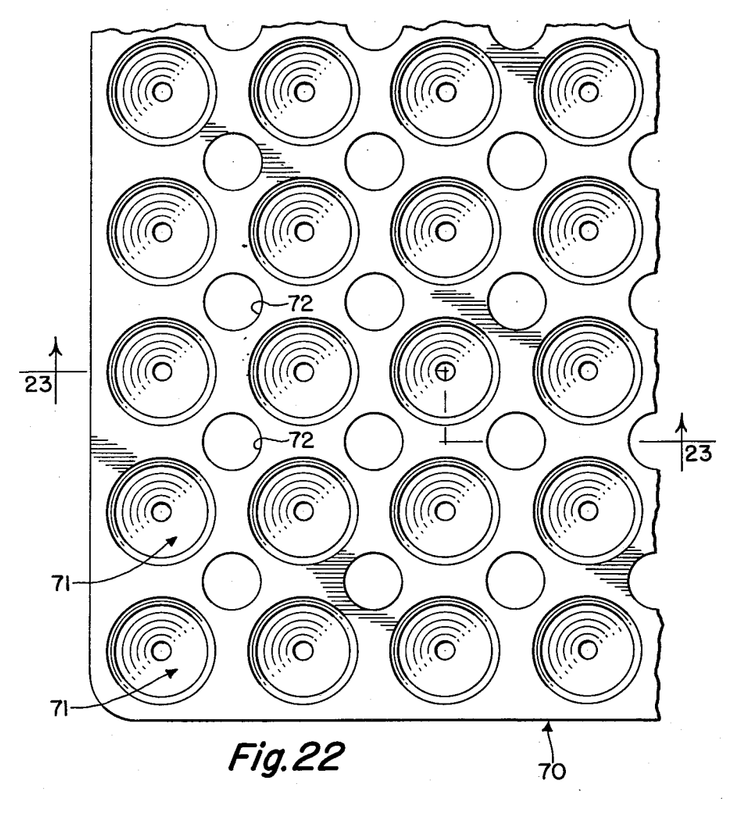
FIG. 22 is a top plan view of a portion of another embodiment of a rigid tray for supporting the basic unit during growth of the plants.
Figure 23:
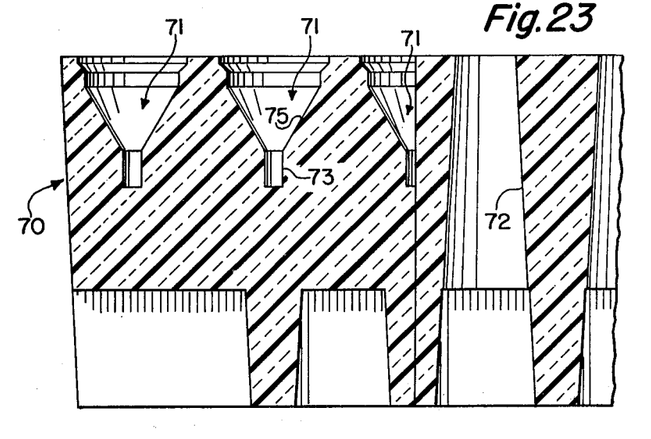
FIG. 23 is a cross-sectional view of the structure shown in FIG. 22 and taken substantially along the line 23—23 of FIG. 22.
Figure 26:
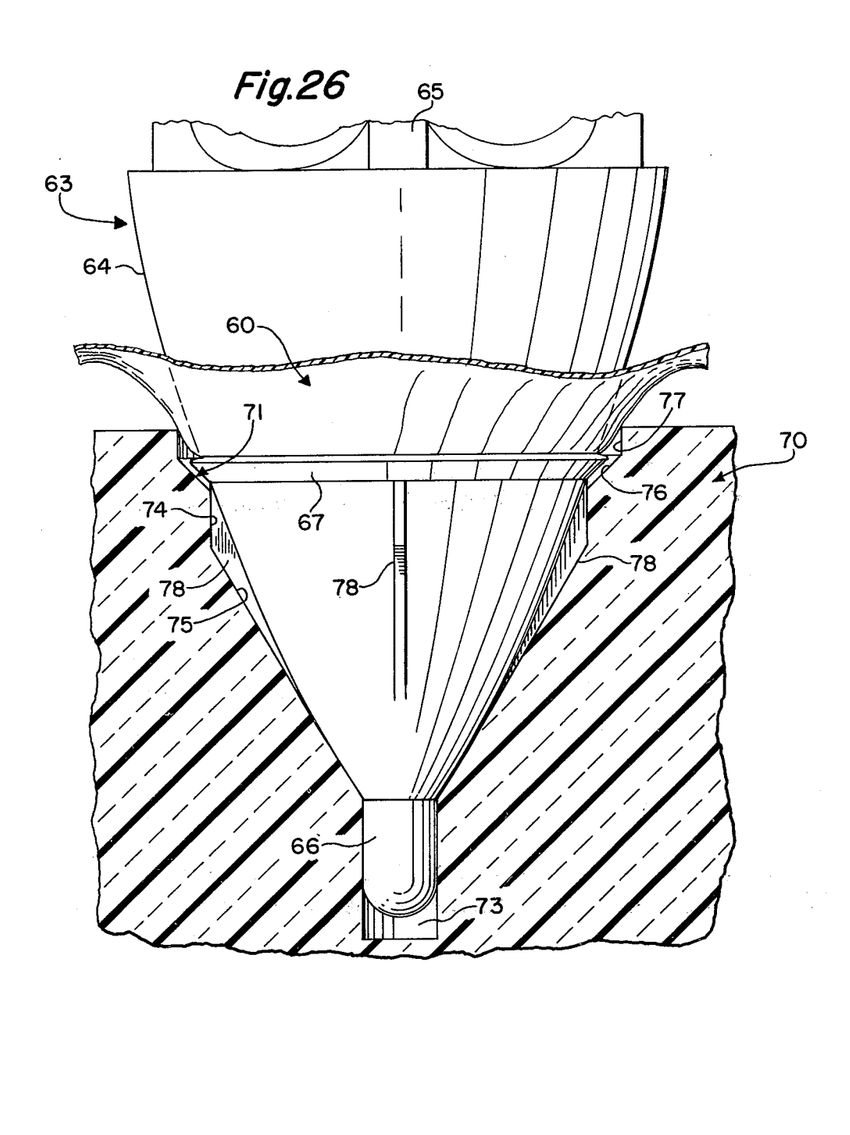
FIG. 26 is an enlarged side elevational view of the container of FIGS. 24 and 25 associated with the carrier of FIG. 21 and the tray of FIGS. 22 and 23.

FIGS. 22, 23 and 26 show portions of a tray 70 intended for use with the containers 63 and carrier sheet 60. In the embodiment of the tray 70 shown, the tray is shown in a substantial block form such as it may conveniently be molded if molded of a foamed plastic material. Those skilled in this art will understand that the tray 70 may be molded in a substantially skeletal form if molded from a dense plastic material in an injection molding process.

The upper surface of the tray 70 is provided with a plurality of container holding pockets 71 arranged in substantially the same pattern as the apertures 61 in the carrier sheet 60. The tray 70 is further provided with a plurality of drainage openings 72 disposed between the container holding pockets 71 in substantially the same pattern as the drainage openings 62 in the carrier sheet 60. The drainage openings 72 extend completely through the tray 70 from the upper surface to the lower surface thereof.

FIG. 26 shows a container holding pocket 71 in substantially enlarged cross section with the base section 64 of a container 63 disposed therein to show the cooperation between the base section 64 and the pocket 71. The lower end of each pocket 71 is provided with a cylindrical hole 73 of a diameter substantially equal to the outer diameter of the pin projection 66 of the base section 64 of a container 63. Each cylindrical opening 73 is longer than a pin projection 66 to enable each container 63 to be fully seated in a pocket 71. Adjacent the upper end of each pocket 71, each pocket 71 is provided with a cylindrical section 74. The lower edge of each cylindrical section 74 is connected to the upper end of a frustum shaped wall 75 the lower end of which is connected to the upper end of the cylindrical hole 73. The upper end of the cylindrical section 74 is connected to an upwardly and outwardly diverging wall section 76 shaped as a shallow frustum. A short cylindrical wall section 77 connects the upper end of the wall section 76 to the upper surface of the tray 70.

The base section 64 of each container 63 is further provided with a plurality of rib elements 78. In a preferred embodiment, the ribs 78 are four in number and are integrally formed on the outer surface of the base section 64 of each container 63 in equally spaced apart positions circumferentially thereof. Each rib 78 is aligned in a vertical direction and each rib 78 extends downwardly from a position immediately below the shoulder 67. The radially outwardmost portion of each rib 78 has a straight edge which is disposed on a vertical line parallel to the longitudinal axis of the container 63 and is further of a length substantially equal to the height of the upper cylindrical wall section 74 of the pocket 71. The straight edges of the rib elements 78 lie on a cylindrical surface of a diameter substantially equal to the diameter of the cylindrical wall section 74 of the pocket 71. The remainder of each rib 78 below the radially outwardmost portion merges downwardly into the outer surface of the base section 74 at substantially the cone angle of the pocket wall 75.

As may be seen in FIG. 26, the above described arrangement permits the base section 64 of each container 63 to be firmly seated in a pocket 71. Substantial clearance is provided between the shoulder 67 and the wall section 76 to insure that the rib elements 78 and the pin projections 66 of each base section 64 are the elements which engage the associated wall sections of each pocket 71. In reductions to practice of the instant embodiment, it has been found that the described containers 63 are extremely stable in the tray 70 during handling of the tray 70 with containers 63 therein throughout the various handling procedures described above relative to the other embodiments of the invention. The stable condition is believed to be due to the defined container and tray arrangement of two substantially vertically separated cylindrical areas. A slight upward movement of a container 63 relative to a pocket 71 will not result in the container tipping. In other words, accurate vertical alignment of each container 63 in the tray 70 is maintained over a substantial increment of vertical movement of each container 63 in a pocket 71 of the tray 70.

As described above relative to the other embodiments, the basic unit of the containers 63 and the carrier sheet 60 is easily and conveniently inserted in the tray 70 as a unit and the carrier sheet 60 does not interfer with the proper association of the containers 63 with the tray 70. Removal of the basic unit to remove all of the containers 63 at one time is also a simple operation. Those skilled in this art will appreciate the need to keep the upper end of each base section 64 upwardly removed from the carrier sheet 60 and the tray 70 to avoid any bridging surface between adjacent containers at the water drainage areas of the containers and thereby prevent root bridging between containers.

Reductions to practice of the various described embodiments of the invention have shown that culling of containers from a carrier sheet and tray assembly is easily accomplished. Culling is often necessary in the growing of seedlings in a group when all of the seedlings do not experience the same uniform desirable growth. Culling becomes particularly important when, with some species of plants, the percentage of germination of the seeds is very low. For example, in reductions to practice of the invention, it has been found that seeds of the conifer known as Noble Pine will more often than not exhibit a percentage of germination in the area of fifty percent. Thus it is apparent that with such a specie of plant substantial culling is necessary to produce a complete container grouping with a growing seedling in each container. In culling it is merely necessary to grasp the upper end of one of the containers and pull it from its gripped engagement with the carrier sheet and from the tray pocket. Another container with a properly growing seedling in it may then be pushed downwardly through the vacant carrier sheet aperture and into the tray pocket associated therewith. Those skilled in this art will understand from the foregoing that unexpected labor savings can be achieved in practicing the invention in its various embodiments.

Having described the invention, it is to be understood that changes can be made in the described embodiments by one skilled in the art within the spirit and scope of the invention as defined in the claims.

I claim:

1. In a planting system including a carrier of a sheet of flexible elastic plastic material in which a plurality of containers for growing plants are held by the bottom ends thereof in said carrier in a pattern of a plurality of parallel rows and ranks transversely of said rows and in which the carrier is provided with openings between said containers, the method of assembling and filling said containers for growing a plurality of plants in said containers as a unit comprising the steps of:
   inverting said carrier and said plurality of containers on a substantially horizontal supporting surface,
   providing and applying an inverted tray having a plurality of upstanding posts onto the bottom portions of said containers through said openings in said carrier,
   inverting said plurality of containers and said tray to an upright position on said horizontal supporting surface,
   providing and applying a filler plate having a plurality of holes therethrough arranged in the pattern of said containers in said carrier in said tray over the upper end of said containers,
   depositing a bulk quantity of growing medium on the upper surface of said filler plate,
   and brushing said growing medium repeatedly over the upper surface of said filler tray to cause the growing medium to fall through the openings in said filler tray into said containers to fill said containers with said growing medium.

2. In a planting system, the method of assembling and filling a plurality of containers for growing a plurality of plants as a unit comprising the steps of:
   providing a plurality of containers for growing plants with a depending pin projection on the underside of each container,
   providing a carrier of a sheet of elastic plastic material with a plurality of container receiving apertures arranged in a pattern of a plurality of parallel rows and ranks transversely of said rows and assembling said carrier and said containers with each of said pin projections of said containers inserted in one of said apertures and grippingly engaged by the peripheral edge of each of said apertures to hold said containers in said carrier to permit said carrier and said plurality of containers to be carried as a unit,
   inverting said carrier and said plurality of containers on a substantially horizontal supporting surface,
   providing and applying an inverted tray having individual container receiving pockets onto the bottom portions of said containers in said carrier,
   inverting said plurality of containers and said tray to an upright position with said tray on said horizontal supporting surface,
   providing and applying a filler plate having a plurality of holes therethrough arranged in the pattern of said containers in said carrier in said tray over the upper end of said containers, depositing a bulk quantity of growing medium on the upper surface of said filler plate, and brushing said growing medium repeatedly over the upper surface of said filler tray to cause the growing medium to fall through the holes in said filler tray into said containers to fill said containers with said growing medium.

3. In a planting system, the combination of a plurality of containers for growing plants and a carrier for said containers, each of said containers comprising an elongated substantially cylindrical container having an open upper end and a bottom wall portion, a depending pin projection on the underside of said bottom portion of each of said containers, said carrier comprising a sheet of elastic plastic material, said sheet having a plurality of container receiving apertures arranged in a pattern of a plurality of parallel rows and ranks transversely of said rows, said apertures being spaced-apart in said rows and ranks a distance at least as great as the maximum diameter of one of said containers, each of said apertures having a peripheral dimension less than the maximum diameter of one of said pin projections and substantially less than the maximum diameter of said containers, said containers carried in a substantially parallel relationship on one side of said sheet with the pin projections of each container extending through one of said apertures, said carrier further formed to have a plurality of second apertures, said second apertures being substantially larger in diameter than said container receiving apertures and arranged in ranks and files within the rows and ranks of said container receiving apertures, a tray for holding the combination of said containers and said carrier in a unitary arrangement with said containers being substantially rigidly held in upstanding positions, said tray comprising a plurality of upstanding post members, said plurality of upstanding post members arranged in the pattern of said second apertures in said carrier and extending through said second apertures and into opposed side engagement with said bottom portions of said containers in upstanding positions in a unitary arrangement in said tray.

4. In a planting system as defined in claim 3, and said tray including a plurality of apertures in the bottom wall thereof arranged centrally between said post members and telescopically receiving said pin projections of each of said containers therein.

5. In a planting system as defined in claim 3, wherein the bottom wall portion of each of said containers includes a depending nose section having sidewalls tapered downwardly and inwardly with said pin projection depending from the lower tip of each of said nose sections, and said post members having substantially complementary upwardly and outwardly tapered side surfaces supportively engaging the sides of said nose sections of each of said containers.

6. In a planting system having a plurality of separate identical plant growing containers in which the outer surface of the base section of each container is tapered downwardly and inwardly and in which said containers are supportable in upright positions in a tray having container holding pockets adapted to engage the outer surface of said base section of said containers, an improved arrangement for handling said plurality of containers for insertion in and removal from said container holding tray as a unit and for culling and replacing individual containers in said tray comprising a sheet of flexible elastic material having a plurality of apertures therein arranged in a pattern substantially coinciding with the spacing of said plurality of container holding pockets in said tray, each of said apertures having a peripheral dimension permitting the base section of one of said containers to be partially inserted through one of said apertures in a resiliently gripped condition with the container upstanding from said sheet, and said sheet being formed and positionable on said containers to cooperate with the upper surface area of said tray to permit said containers with said sheet thereon to be inserted in and removed from said container holding pockets in said tray as a unit and for culling and replacing individual containers in said containers holding pockets and in said sheet.

* * * * *